United States Patent
Ivanov et al.

(10) Patent No.: US 8,291,478 B2
(45) Date of Patent: Oct. 16, 2012

(54) SYSTEM AND METHOD FOR INFORMATION HANDLING SYSTEM MULTI-LEVEL AUTHENTICATION FOR BACKUP SERVICES

(75) Inventors: Andrei Ivanov, Cedar Park, TX (US); Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 12/784,851

(22) Filed: May 21, 2010

(65) Prior Publication Data
US 2011/0289561 A1    Nov. 24, 2011

(51) Int. Cl.
H04L 29/06    (2006.01)
(52) U.S. Cl. .......................... 726/5; 713/155
(58) Field of Classification Search ............... 726/4, 5, 726/6, 7, 8, 21, 28; 713/155, 182, 185; 709/217–219
See application file for complete search history.

(56) References Cited

U.S. PATENT DOCUMENTS
2009/0064287 A1 * 3/2009 Bagepalli et al. ................ 726/4

OTHER PUBLICATIONS

A. Christensen et al., Security Analysis of the NDMP Protocol, http://www-users.itlabs.umn.edu/classes/Fall-2008/csci5271/ndmp.pdf, 2008.

* cited by examiner

Primary Examiner — Edward Zee
(74) Attorney, Agent, or Firm — Hamilton & Terrile, LLP; Robert W. Holland

(57) ABSTRACT

Access to backup information, such as at network attached storage compliant with NDMP, is managed by interfacing a backup authentication mechanism with a primary authentication system and responding to requests for backup information according to permissions defined by the primary authentication system. A data management application requests access to backup information with an NDMP MD5 hash and includes a domain name and password for an LDAP or AD authentication through a pluggable authentication module. Access to backup information is provided based upon the permissions associated with the domain of the primary authentication mechanism.

9 Claims, 2 Drawing Sheets

SYSTEM AND METHOD FOR INFORMATION HANDLING SYSTEM MULTI-LEVEL AUTHENTICATION FOR BACKUP SERVICES

BACKGROUND OF THE INVENTION

1. Field of the Invention

The present invention relates in general to the field of information handling system backup services, and more particularly to a system and method for information handling system multilevel authentication for backup services.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As individuals and enterprises have grown dependent upon information handling systems, one concern that has arisen is backing up information so that the information is not lost in the event of a catastrophic failure. A variety of backup devices are available to automatically backup information through cable or network interfaces, such as network attached storage (NAS) devices. In order to simplify the setup and use of backup devices, industry has developed the Network Data Management Protocol (NDMP), a standards based mechanism by which a backup application on an information handling system communicates with a file server for backup of the file systems. The NDMP architecture has a data server resident on the file server to be backed up and a backup application known as a Data Management Application (DMA) and a server component that are associated with a backup device. NDMP provides a MD5 hash based authentication mechanism by which a DMA client authenticates with network attached storage (NAS) to access files on NAS for backup or restore actions. User credentials for backup and restore actions are managed by the NDMP data server resident on the file server. The NDMP data server accesses the file system at a few preset permission levels. NDMP credentials are set for the entire NAS file system and are managed for the NAS file system as a whole.

One difficulty that arises with the NDMP architecture is that the credentials of backup and restore actions do not correspond to credentials used by other network solutions. Large scalable file systems having multiple nodes are often aggregated to present a single name space. Various portions of the file system have different sets of credentials. For example, the file system may be divided into different administrative and usage domains that have different access permissions. Thus, a network user who retrieves and stores data to a file server under a given user name and password set of credentials typically cannot retrieve or store data at a NAS file system using the file server credentials. Typically, backup and restore services are separately managed and accessed by information technology personnel who have credentials for the entire NAS file system. Relying upon separate sets of credentials creates inefficiency in network management in several ways. For example, information technology involvement introduces delay and overhead costs for retrieval of specific information by a particular end user. As another example, information technology personnel face complexity when attempting to isolate and retrieve data associated with a particular end user. In addition, information technology personnel who have to maintain multiple administrative and usage domains in a network space face additional labor and complexity by having to maintain independent access permissions for NDMP network space.

SUMMARY OF THE INVENTION

Therefore a need has arisen for a system and method which provides a unified mechanism for supporting multiple backup users with dynamic credentials managed through an existing file system authentication mechanism.

In accordance with the present invention, a system and method are provided which substantially reduce the disadvantages and problems associated with previous methods and systems for managing access to network backup devices. A request to a backup device for access to backup information is made with a backup authentication mechanism and includes primary authentication information for a primary authentication mechanism. The backup device queries the primary authentication mechanism to allow access to the backup information according to permissions associated with the primary authentication mechanism.

More specifically, network attached storage has a processor that executes an NDMP agent to respond to requests by data management applications to store or retrieve data. A backup mechanism uses NDMP MD5 hash code to challenge requests from data management applications. A data management application responds to the challenge with an NDMP MD5 hash response and also includes authentication information of a primary authentication mechanism, such as an LDAP or AD authentication. For example, the data management application responds with a domain name of the primary authentication mechanism that defines the permissions of the data management application within a network plus an MD5 hash string that allows calculation of the primary authentication password by the NDMP agent. The backup mechanism applies the primary authentication information to a primary authentication mechanism, such as though an LDAP or AD server having a pluggable authentication module adapted to respond to backup device requests. The primary authentication mechanism responds with permissions associated with the primary authentication information, such as files accessible by a domain and password combination. The NDMP agent allows access by the data management application to the network attached storage for the files associated with the primary authentication information.

The present invention provides a number of important technical advantages. One example of an important technical advantage is that a unified mechanism supports multiple backup users with dynamic access credentials that are managed through an existing network authentication mechanism of a file system so that users get a specific view of the file server as defined by permissions assigned to that user. By extending existing network access credentials to backup devices, information technology administrators face less complexity in managing data backup and retrieval. For example, end users can retrieve backup data through direct access to the backup devices without coordination through network administrators to obtain access credentials. Network administrators face less network management complexity by having a common set of access credentials for both the network space and the backup space. By passing authentication requests through existing network authentication mechanisms, such as an active directory (AD) or Light Weight Directory Access Protocol (LDAP), compliance with NDMP standard protocols are maintained while supporting the unified access mechanism.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Access to backup information of an information handling system is managed by accessing a primary authentication mechanism through a backup authentication mechanism and providing information according to permissions established by the primary authentication mechanism. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
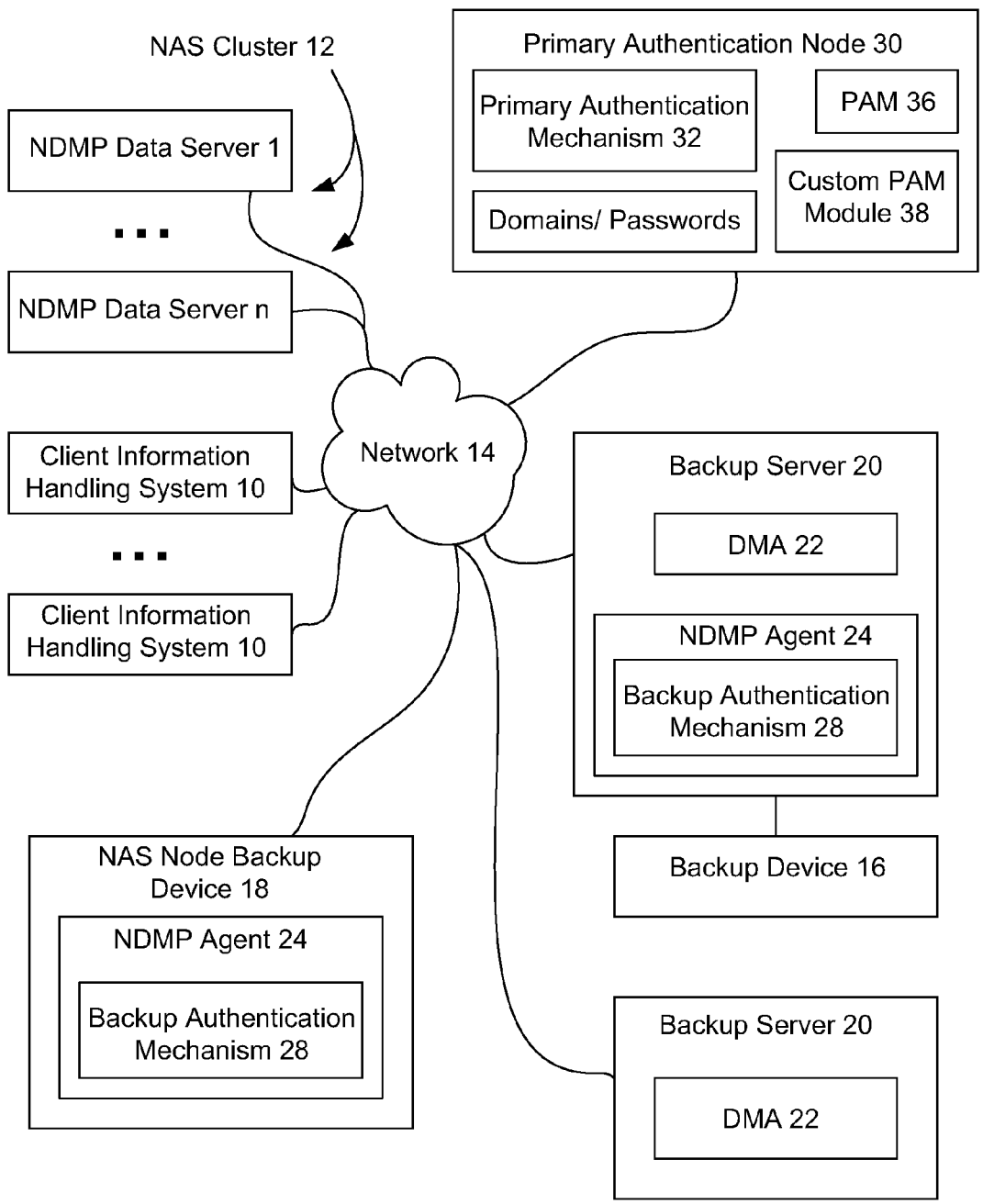
FIG. 1 depicts a block diagram of network attached storage managed by primary and secondary authentication mechanisms.

Referring now to FIG. 1, a block diagram depicts network attached storage managed by primary and secondary authentication mechanisms. Client information handling systems 10 execute applications on processors and memory to create information that is stored locally or on network storage, such as on a Network Attached Storage (NAS) cluster 12 accessed through a network 14, such as a local area network (LAN). In order to provide reliable storage of information, information generated by client information handling systems 10 and information stored on NAS cluster 12 is periodically backed up as backup information in backup storage devices, such as a backup device 16 or a NAS node backup device 18. For example, an NDMP compliant backup system stores a backup of information from network 14 and makes the backup information available as needed, such as to provide recovery of information in the event of a catastrophic failure of a client information handling system 10 or node within NAS cluster 12. Two examples of NDMP compliant backup are provided in FIG. 1, although alternative embodiments might include other types of NDMP compliant backup architectures known in the art. In one embodiment, a backup server supports a Data Management Application (DMA) 22 and an NDMP agent 24 that cooperate to backup and recover information at a backup device 16 directly attached to backup server 20, such as a tape drive. In an alternative embodiment, an NAS node back up device 18 acts as the backup device to store information for a backup server 26 having a DMA 22 to coordinate backup and recovery with an NDMP agent 24 executing on a processor and memory of NAS node backup device 18.

In order to secure backup information stored on backup devices 16 and 18 in a manner compliant with NDMP, a local NDMP agent 24 supports a backup authorization mechanism 28 that uses an MD5 hash security code to secure all files of the backup system with pre-shared credentials. Since NDMP secures all files of a backup system with a backup mechanism that has pre-shared credentials, authorization to access backup files, such as to restore a client information handling system 10, differs from authorization or permissions established for network 14, such as domain and password combinations maintained by a network primary authentication mechanism node 30, such as a Light Weight Directory Access Protocol (LDAP) or Active Directory (AD) server. In order to support a common authentication scheme across all users of network 14, including backup users, a pluggable access module (PAM) solution added to primary authentication mechanism node 30 interfaces the backup and primary authentication mechanisms. A client information handling system that requests backup information from a backup device 16 or 18 is challenged for an MD5 hash code by NDMP agent 24 in accordance with the NDMP standard. In response, client information handling system provides the code for the backup authentication mechanism 28 and also includes information for the client information handling system's primary authentication access permission, such as a domain used to access network 14 under primary authentication node 30 and an MD5 hash string. NDMP agent 24 calculates a password associated with the domain based upon the MD5 hash string. Backup authentication mechanism 28 queries primary authentication node 30 with the primary authentication information. A primary authentication mechanism 32 analyzes the primary authentication information, such as by comparing the information with established domains and passwords 34, and interacts with a pluggable authentication module (PAM) 36 to determine permissions for the client. In one embodiment, a custom PAM 38 is maintained at primary authentication node 30 to manage backup device access requests. Primary authentication node 30 responds to the query from backup authentication mechanism 28 with permissions of primary authentication information, such as files authorized under a domain and password, so that NDMP agent 24 allows access by client information handling system 10 according to the primary authentication information, such as backup files associated with the domain and password rather than all backup files accessible under the backup authentication mechanism.

Figure 2:
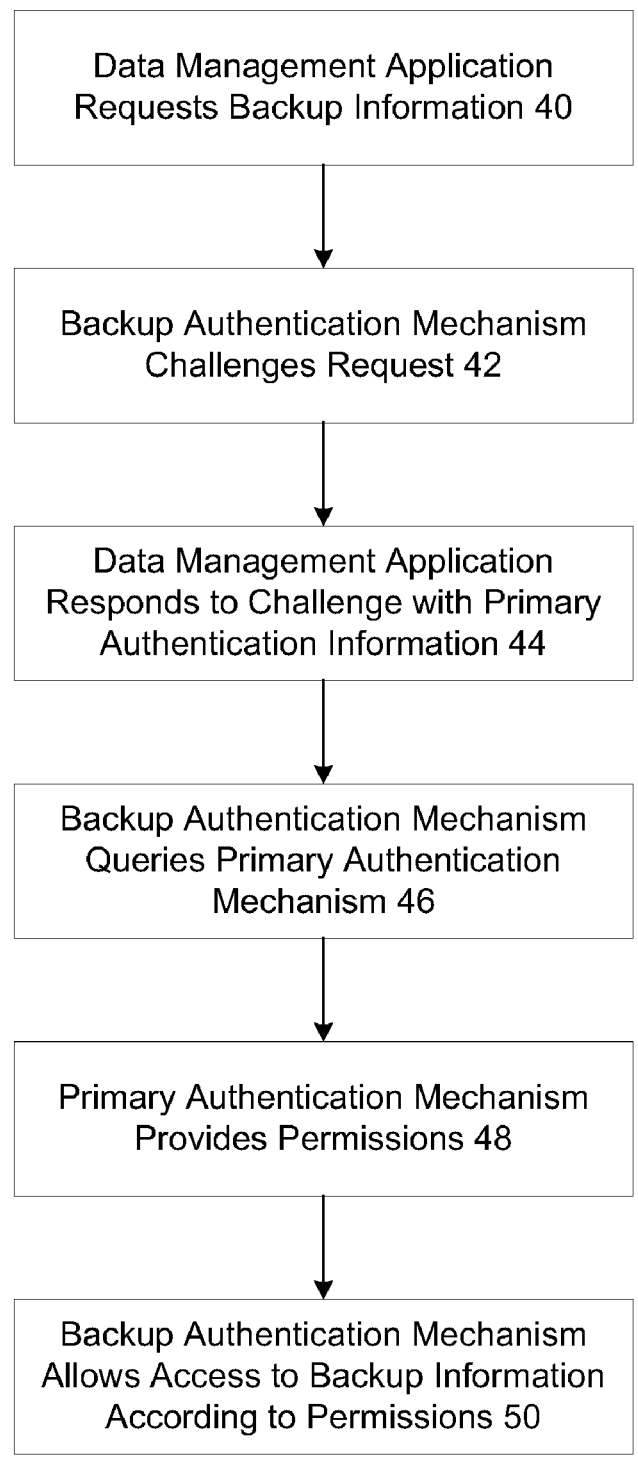
FIG. 2 depicts a flow diagram of a process for managing access to backup information protected by a backup authentication mechanism based upon permissions provided from a primary authentication mechanism.

Referring now to FIG. 2, a flow diagram depicts a process for managing access to backup information protected by a backup authentication mechanism based upon permissions provided from a primary authentication mechanism. The process begins at step 40 with a data management application request for information from a backup device, such as with a command of NDMP_CONFIG_GET_AUTH_ATTR. For example, a client information handling system sends a request for backup information to DMA executing on an NDMP backup server. At step 42, the backup mechanism responds to the data management application request by issuing a challenge for a password to establish authorization for access to backup information. For example, an NDMP agent executing on the backup device requests information to calculate a password from the DMA. At step 44, the data management application responds with backup authentication mechanism information and includes primary authentication mechanism information, such as with a command of NDMP_CONNECT_CLIENT_AUTH (User/md5 challenge+password). At step 46, the backup authentication mechanism forwards the primary authentication mechanism information to the primary authentication mechanism in order to obtain permissions for the request. For example, the NDMP agent sends a domain and password provided by a DMA to an LDAP or AD authentication node that the LDAP or AD would normally use to manage access to the network. At step 48, the primary authentication mechanism responds to the query by the backup authentication mechanism with permission associated with the primary authentication information. At step 50, the backup authentication mechanism allows access to the backup information as defined by the permissions of the primary authentication mechanism.

Although the present invention has been described in detail, it should be understood that various changes, substitutions and alterations can be made hereto without departing from the spirit and scope of the invention as defined by the appended claims.

What is claimed is:

1. An information handling system comprising:
    an information processing node having a processor operable to generate information for storage and retrieve information from storage, the information processing node accessing information according to a first authentication mechanism;
    a storage node having a processor and a storage medium, the storage node interfaced with the information processing node through a network, the storage medium storing information according to a second authentication mechanism;
    an authentication node interfaced with the network and operable to authenticate information requests under the first authentication mechanism; and
    a data management application executing on the information processing node processor and operable to interact with the storage node to retrieve information, the data management application further operable to authenticate communications with the storage node by a message of the second authentication mechanism that includes information of the first authentication mechanism;
    wherein the storage node is further operable to authenticate communications of the data management application by communicating the information of the first authentication mechanism to the authentication node;
    wherein the second authentication mechanism comprises a Network Data Management Protocol (NDMP) hash code and the first authentication mechanism comprises a Light Weight Directory Access Protocol (LDAP) or an Active Directory;
    wherein the information of the first authentication mechanism comprises a domain of less than all information stored on the storage medium.

2. The information handling system of claim 1 wherein the storage node comprises network attached storage.

3. The information handling system of claim 2 wherein the second authentication mechanism comprises an MD5 hash.

4. The information handling system of claim 2 wherein the authentication node comprises pluggable authentication module.

5. A method for managing access to backup information stored on a backup device, the method comprising:
    requesting with a network device the backup information from the backup device using a backup authentication mechanism and including information of a primary authentication mechanism;
    requesting with the backup device from an authentication node access permission of the network device based upon the information of the primary authentication mechanism;
    challenging the network device by the backup device using the backup authentication mechanism; and
    responding to the challenging with the network device by using the backup authentication mechanism and including the information of a primary authentication mechanism;
    wherein the information of the primary mechanism comprises a domain, the method further comprising allowing access by the network device only to the backup information associated with the domain;
    wherein the backup authentication mechanism comprises an NDMP hash code and the primary authentication mechanism comprises an LDAP or an Active Directory.

6. The method of claim 5 wherein the backup authentication mechanism comprises an MD5 hash.

7. The method of claim 5 wherein the primary authentication mechanism comprises a pluggable authentication module executing on the authentication node.

8. The method of claim 5 further comprising:
    receiving at the backup node the access permission from the authentication node; and
    allowing access by the network device to less than all of the information stored by the backup device according to the access permission.

9. A system for managing access to backup information stored at a network attached storage, the system comprising:
    the network attached storage having a processor;
    a data management application operable to request access to backup information using a backup authentication mechanism that communicates a primary network access domain associated with a primary authentication mechanism;
    an authentication module executing at the network attached storage processor and operable to allow access to the backup information by the data management application by forwarding the primary network access domain to a primary network authentication node, receiving authorization from the primary network authentication node for access to the backup information by the data management application and providing access to the data management application only for the backup information associated with the primary network access domain;
    wherein the backup authentication mechanism comprises an NDMP hash code and the primary authentication mechanism comprises an LDAP or an Active Directory.

* * * * *